No. 770,843. PATENTED SEPT. 27, 1904.
F. H. BLANKLEY.
COOKING UTENSIL OR OTHER VESSEL.
APPLICATION FILED OCT. 30, 1902.
NO MODEL.
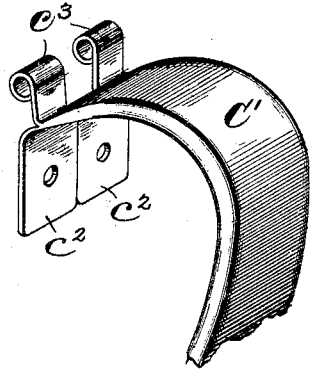
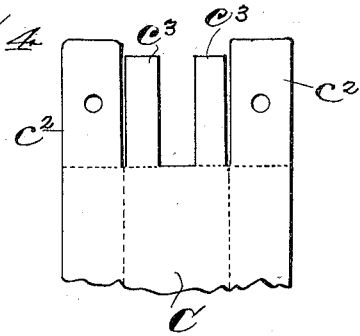
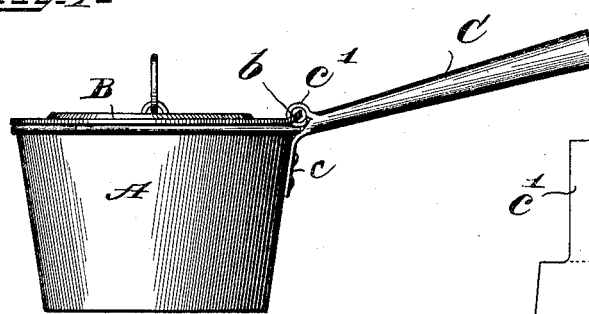
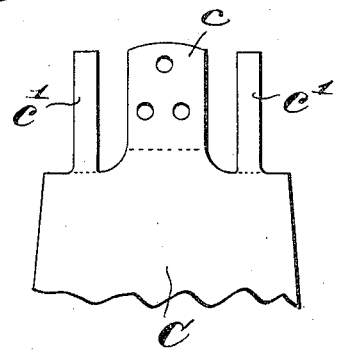
WITNESSES
INVENTOR
Frank H. Blankley
By Charles S. Hill, his Atty.

No. 770,843.

Patented September 27, 1904.

UNITED STATES PATENT OFFICE.

FRANK H. BLANKLEY, OF TERRE HAUTE, INDIANA, ASSIGNOR TO COLUMBIAN ENAMELING AND STAMPING COMPANY, OF TERRE HAUTE, INDIANA, A CORPORATION OF INDIANA.

COOKING UTENSIL OR OTHER VESSEL.

SPECIFICATION forming part of Letters Patent No. 770,843, dated September 27, 1904.

Application filed October 30, 1902. Serial No. 129,503. (No model.)

*To all whom it may concern:*

Be it known that I, FRANK H. BLANKLEY, a citizen of the United States, residing in the city of Terre Haute, in the county of Vigo and State of Indiana, have invented certain new and useful Improvements in Vessels for Cooking or other Purposes, of which the following is a specification.

My invention relates to vessels for cooking and other purposes, more especially of the class provided with hinged lids or covers; and the object of my invention is to provide efficient, economical, and durable means for hinging covers to vessels of the kind to which my invention pertains.

Referring to the accompanying drawings, wherein like letters indicate the same or corresponding parts, Figure 1 is a side view of a vessel embodying my invention. Fig. 2 is a fragmentary plan view of a blank from which the form of handle shown in Fig. 1 is formed. Fig. 3 is a fragmentary side view of a modified form of handle embodying my invention. Fig. 4 is a fragmentary plan view of a blank from which the form of handle shown in Fig. 3 is formed.

Referring to Figs. 1 and 2 of the drawings, A represents a vessel-body; B, the lid or cover thereto. The handle C, or at least the portion of the handle adjacent to the vessel, is made of a single piece of metal which in its finished form bifurcates in the manner shown. The branch $c$ extends downward on the side of the vessel and is attached thereto by rivets or other suitable means. The upwardly-extending branches $c'$ $c'$ in the finished form are bent to form loops or eyes for engaging the suitably-apertured rear portion $b$ of the cover B. Inasmuch as the branches $c'$ of the handle penetrate the apertured cover B a hinged connection will be formed between said handle and cover.

The form of handle C' shown in Figs. 3 and 4 is similar to the form shown in Figs. 1 and 2, with the exception that there are two branches $c^2$ $c^2$ adapted to be fastened to the side of the vessel, and the loops or eyes formed in the branches $c^3$ $c^3$ rise to a slightly greater height to illustrate the adaptability of the handle to a slight variation in the form of cover.

By forming the handle of a single piece of metal, as shown, and bifurcating the inner extremity thereof, so as to form a point of attachment for the cover and afford means of attachment for the handle to the body of the vessel, the utensil is not only durable, but simple in construction and economical in manufacture.

What I claim as new, and desire to secure by Letters Patent, is—

1. In a vessel, the combination with the vessel body and cover, of a one-piece metal handle having a plurality of branches formed thereon, some of said branches being attached to the vessel-body and some of said branches forming a point of attachment for the cover.

2. In a vessel for culinary purposes, the combination, with the vessel body and cover, of a one-piece metal handle having a plurality of branches formed thereon, some of said branches extending downwardly, and some of said branches extending upwardly, said cover and the upwardly-extending branches being interpenetrating to thereby form a hinged connection between said cover and said handle.

3. In a vessel for culinary purposes, the combination of a vessel-body, an apertured cover and a one-piece sheet-metal handle having a plurality of branches formed thereon, some of said branches being bent downwardly for attachment to the vessel-body and the remaining ones of said branches extending upwardly and having loops formed therein, penetrating said cover for making hinged connection therewith.

FRANK H. BLANKLEY.

Witnesses:
W. TOPPING,
J. RUSK.